United States Patent
Bazargan et al.

(10) Patent No.: US 11,176,389 B2
(45) Date of Patent: Nov. 16, 2021

(54) NON-INTRUSIVE INTRA-VEHICULAR USER LOCATION DETECTION

(71) Applicant: Telefonaktiebolaget LM Ericsson (publ), Stockholm (SE)

(72) Inventors: Sanaz Bazargan, Los Gatos, CA (US); Yogesh Bhatt, Santa Clara, CA (US); Vinod Neelanath, Santa Clara, CA (US); Meral Shirazipour, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/619,903

(22) PCT Filed: Jun. 6, 2017

(86) PCT No.: PCT/IB2017/053338
§ 371 (c)(1),
(2) Date: Dec. 5, 2019

(87) PCT Pub. No.: WO2018/224860
PCT Pub. Date: Dec. 13, 2018

(65) Prior Publication Data
US 2021/0081688 A1 Mar. 18, 2021

(51) Int. Cl.
*G06K 9/00* (2006.01)
*G06K 9/62* (2006.01)
*H04N 5/247* (2006.01)
*H04W 88/02* (2009.01)
(Continued)

(52) U.S. Cl.
CPC ..... *G06K 9/00838* (2013.01); *G06K 9/00362* (2013.01); *G06K 9/6263* (2013.01); *H04N 5/247* (2013.01); *H04W 88/02* (2013.01)

(58) Field of Classification Search
CPC ...... G06K 9/00832; G06T 2207/30268; G06T 2207/30248; G06T 2207/30
See application file for complete search history.

(56) References Cited

U.S. PATENT DOCUMENTS 8,706,143 B1 4/2014 Elias
2007/0054672 A1 3/2007 Onishi et al.
(Continued)

OTHER PUBLICATIONS

Wan J, Wang D, Hoi SC, Wu p. Zhu J, Zhang Y, Li J. Deep learning for content-based image retrieval: A comprehensive study. InProceedings of the 22nd ACM international conference on Multimedia Nov. 3, 2014 (pp. 157-166). (Year: 2014).*

(Continued)

*Primary Examiner* — Clifford Hilaire
(74) *Attorney, Agent, or Firm* — NDWE LLP

(57) ABSTRACT

A mobile device automatically determines which location of a plurality of locations of a vehicle a user of the mobile device is located at without knowing assistance of the user. The mobile device determines that the mobile device is likely in a moving vehicle and that the user is actively interacting with the mobile device. The mobile device captures an image via an optical sensor of the mobile device without assistance from the user for the capture. The mobile device determines a location of the user within the vehicle based upon an analysis of the image. The analysis includes an execution of a model that utilizes at least the captured image as an input to determine the location. The mobile device, after determining the location, performs one or more actions.

28 Claims, 11 Drawing Sheets

(56) References Cited

U.S. PATENT DOCUMENTS

| | | | | |
|---|---|---|---|---|
| 2009/0116737 A1* | 5/2009 | Kiraly | ............... | G06T 7/11 |
| | | | | 382/160 |
| 2012/0214463 A1* | 8/2012 | Smith | ............... | H04W 4/027 |
| | | | | 455/418 |
| 2014/0187219 A1 | 7/2014 | Yang et al. | | |
| 2015/0141043 A1* | 5/2015 | Abramson | ............... | H04W 4/027 |
| | | | | 455/456.1 |
| 2016/0014265 A1* | 1/2016 | Ludick | ............... | H04W 4/029 |
| | | | | 455/418 |
| 2016/0354027 A1 | 12/2016 | Benson et al. | | |

OTHER PUBLICATIONS

AT&T Inc., "AT&T DriveMode(registered), Fact Sheet and Q&A", Join the conversation: #ItCanWait, itcanwait.com, 2013, 3 pages.
Cellcontrol, "Technology to Stop Distracted Driving for Companies and Families", Stop Texting While Driving, Texting While Driving Solution, Retrieved on Feb. 8, 2017, 6 pages.
International Preliminary Report on Patentability, PCT App. No. PCT/IB2017/053338, Dec. 19, 2019, 11 pages.
NVIDIA, "Embedded Systems Developer Kits & Mcxlules", NVIDIA Jetson, Retrieved on May 1, 2017, 7 pages.
OpenCV, "OpenCV (Open Source Computer Vision)", Available Online at <https://web.archive.org/web/20170210181211/https://opencv.org/>, Feb. 8, 2017, 3 pages.
Povey, Daniel, "KALDI", Available Online at <https://web.archive.org/web/20170224074015/http://kaldi-asr.org/>, Feb. 8, 2017, 1 page.
Ross, Philip E., "Eyesight Technologies Will Watch You Drive, and That's a Good Thing", IEEE Spectrum, Mar. 27, 2017, 2 pages.
Scantlebury, Mark, "Roving Reporter: Combatting Driver Fatigue with Mobile Surveillance", Embedded Innovator, Design Solutions for the Internet of Things, Newsletter Article, 2016, 3 pages.
International Search Report and Written Opinion for Application No. PCT/IB2017/053338, dated May 4, 2018, 16 pages.

* cited by examiner

NON-INTRUSIVE INTRA-VEHICULAR USER LOCATION DETECTION

CROSS-REFERENCE TO RELATED APPLICATIONS

This application is a National stage of International Application No. PCT/IB2017/053338, filed Jun. 6, 2017, which is hereby incorporated by reference.

TECHNICAL FIELD

Embodiments relate to the field of computing systems; and more specifically, to non-intrusive techniques for fine-grained intra-vehicular mobile user location detection.

BACKGROUND

With the now-widespread use of mobile electronic devices such as mobile phones and tablets, it is only natural that these devices are frequently being used in vehicles such as cars, buses, trains, etc. While these devices can provide countless benefits to passengers of these vehicles, their presence in these environments can also create some problems. For example, a safety issue can arise when a driver/operator of a vehicle is using their mobile phone while operating the vehicle instead of devoting their attention to the operation of the vehicle, which can lead to the increased likelihood of accidents.

Some attempts have been made to address this and other problems involving the presence and use of mobile devices in vehicles. One attempt to address the distracted driver problem involves using smartphone applications to reduce or block the use of the mobile device or certain features thereof (e.g., for sending text messages) by drivers of a vehicle. These applications tend to be installed on a phone, require some sort of administrative authority/configuration, can be easily disabled and/or require voluntary enablement, and are typically aimed at preventing teenagers—i.e., new drivers—from texting and driving.

One example software-based solution allows access to control music and navigation with one touch, silences text messages and alerts, and can also automatically answer messages while the person is driving. However, such applications must be explicitly enabled by the mobile user— something many users choose not to do, or forget to do. Further, such applications can be overridden (i.e., turned off) when desired. Accordingly, such applications are not often effectively used.

Another set of approaches that attempt to improve the safety of such mobile device use requires the installation of a hardware device within the vehicle, as well as the installation of a control application on the involved mobile devices. The hardware device can help detect if the phone being used is that of the driver. This system is mostly targeted at parents to allow them to control the use of their teenager's phones while they are driving. However, the installation of the extra hardware can be difficult and error-prone, and only protects a limited set of mobile devices within just the one vehicle having the hardware installed.

Another problem brought on by the increased use of mobile devices in vehicles involves shared media consumption. Many of today's vehicles are equipped with one or multiple playback devices allowing the consumption of media (e.g., music, video), such as speakers, display screens, etc. Passengers of a vehicle may carry media consumption devices (e.g., smart phone, tablet), and in some cases, these devices can be used to control what media is played using the in-vehicle playback devices. However, this arrangement typically leads to one person needing to be in complete control of playback. For example, multiple people in a vehicle may (or must) cede control to one person, who then selects content to be played throughout the vehicle. For example, one person may physically control the vehicle's stereo or video display(s) via an in-vehicle control system, or one person may communicatively connect their mobile device (e.g., via a Bluetooth wireless link, physical cable) to a component of the vehicle that allows that person to control playback within the vehicle via the mobile device. Neither of these options presents an optimal configuration, as the in-control person may select content (or have content selected for that person, e.g., a streaming radio station) that may be of interest to precisely that one person, but that might not be of any interest to the other people in the vehicle.

Further, another problem brought on by the increased use of mobile devices in vehicles involves vehicle route-determinations when there are multiple passengers in the vehicle. This problem which can be compounded when the passengers are strangers or change frequently, such as is the case for ride-sharing situations. For example, current map (or global positioning system (GPS)) applications require some sort of manual interaction (e.g., using a physical or virtual keyboard, voice command) to input the destination of any passengers that may be in the car. Thus, a driver may need to frequently input or change destination information into a route-providing device.

SUMMARY

According to some embodiments, a method in a mobile device for automatically determining which location of a plurality of locations of a vehicle a user of the mobile device is located at without knowing assistance of the user includes, responsive to determining, by the mobile device, that the mobile device is likely in a vehicle and that the user is actively interacting with the mobile device, capturing, by the mobile device, an image via an optical sensor of the mobile device without assistance from the user for the capture; determining, by the mobile device, a location of the user within the vehicle based upon an analysis of the image, the analysis including an execution of a model that utilizes at least the captured image as an input to determine the location; and after determining the location, performing, by the mobile device, one or more actions.

In some embodiments, the optical sensor is a rear-facing camera of the mobile device. In some embodiments, the mobile device further comprises a second optical sensor that is a front-facing camera; the method further comprises capturing a second image via the second optical sensor; and the determining of the location is further based at least in part upon the second image.

In some embodiments, the optical sensor is a front-facing camera of the mobile device.

In some embodiments, the determined location is that of a driver of the vehicle; and the one or more actions include at least one of: transmitting an alert notification via a physical network interface of the mobile device, or causing an audio message to be played via a speaker that asks whether the user desires to activate a feature.

In some embodiments, the method further includes determining, by the mobile device, whether there is a second mobile device of a second user in the vehicle. In some embodiments, the one or more actions include causing, by the mobile device, a message to be transmitted to a remote server that identifies the location of the user and further identifies the second user or the second mobile device.

In some embodiments, the method further comprises: determining, by the mobile device using the optical sensor or a second optical sensor of the mobile device, whether there is another person that is not the user in the vehicle or an animal that is in the vehicle. In some embodiments, the one or more actions include causing, by the mobile device, a message to be transmitted to a remote server that identifies the location of the user and further identifies that the another person or the animal is in the vehicle. In some embodiments, a receipt of the message by the remote server causes the remote server to determine one or more media content items to be recommended or played based on the user and the another person or the animal, but in some embodiments, a receipt of the message by the remote server causes the remote server to transmit another message that causes an audio output device to change an audio output volume or a video display setting. In some embodiments, the model, to determine the location, further utilizes touch input sensor data or thermal sensor data as another input According to some embodiments, a non-transitory computer-readable storage medium stores instructions which, when executed by one or more processors of an electronic device, cause the electronic device to perform any of the above methods. According to some embodiments, a computer program product has computer program logic to put into effect any of the preceding methods.

According to some embodiments, a mobile device comprises one or more processors and the non-transitory computer-readable storage medium of the preceding paragraph or the computer program product of the preceding paragraph.

According to some embodiments, a system comprises the mobile device of the preceding paragraph and the remote server.

According to some embodiments, a mobile device to automatically determine which location of a plurality of locations of a vehicle a user of the mobile device is likely located at without knowing assistance of the user comprises: an image capturing module to capture an image without assistance from the user for the capture; a location module to determine a location of the user within the vehicle based upon an analysis of the image, the analysis including an execution of a model that utilizes at least the captured image as an input to determine the location; and an action module to, after determining the location, perform one or more actions.

Some embodiments can detect which location—of multiple possible locations—in a vehicle that a user is likely located at. Some embodiments can perform this detection without any active or knowing assistance of the user, and some embodiments do not require the installation, inclusion, or use of any special-purpose hardware in the vehicle. Embodiments can determine the location of the user at a higher accuracy than using previous techniques.

Some embodiments can cause actions to occur based on the determined location. In some embodiments, when a user is determined to be in an operator/driver position of the vehicle, certain functionalities of the user's mobile device or other components within the vehicle can be enabled or disabled to enhance safety, e.g., to avoid distracting the operator/driver.

Some embodiments can detect the presence of other users in the vehicle and/or the locations of those users. In some embodiments, people, animals, or other objects can similarly be detected along with their location(s) even when these people, animals, etc., may not have mobile devices. In some embodiments, traffic routing determinations for the vehicle can be modified based upon the presence of other people in the vehicle. In some embodiments, the presence of particular types of people (e.g., detecting children, detecting adults, detecting age approximations of people, detecting likely gender identities of people, etc.) or the presence of particular types of animals (e.g., dogs) and/or their locations can be used to cause particular actions to be performed—e.g., changing a volume level of an audio output being played in the vehicle or in particular regions of the vehicle, adapting media content that is played or recommended to be played in the vehicle, etc.

BRIEF DESCRIPTION OF THE DRAWINGS

Embodiments may best be understood by referring to the following description and accompanying drawings. In the drawings.

DETAILED DESCRIPTION

Figure 1:
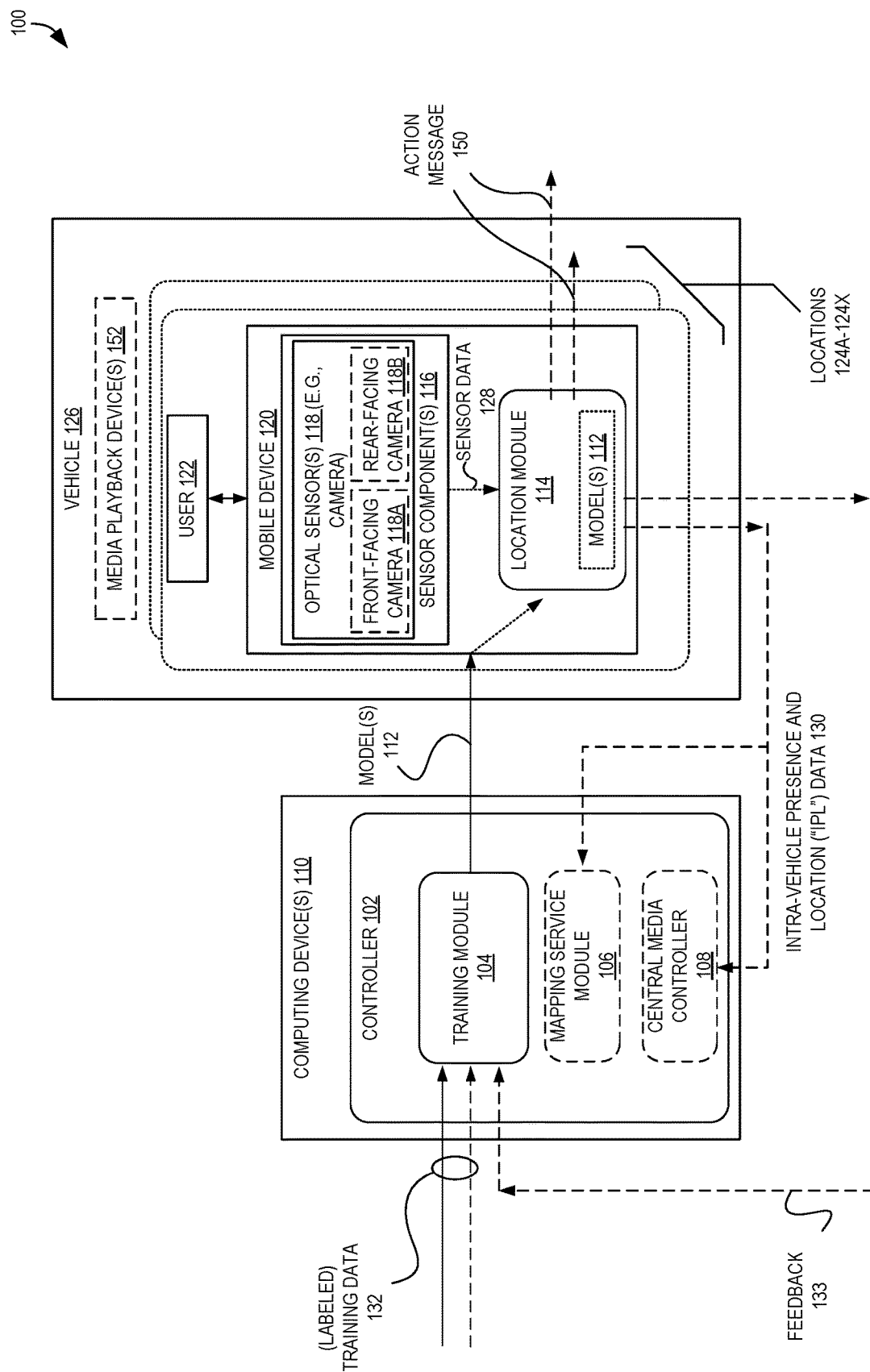
FIG. 1 is a high-level block diagram illustrating a system for non-intrusive intra-vehicular user location detection according to some embodiments.

The following description describes methods, apparatuses, computer-readable media, and systems for non-intrusive intra-vehicular user location detection. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the various embodiments. It will be appreciated, however, by one skilled in the art that embodiments may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

Reference numerals with suffix letters (e.g., 120A, 140N) may be used to indicate that there can be multiple instances of the referenced entity in some embodiments. These multiple instances may or may not be identical, but generally each instance does share some general trait(s) or act in some common way(s). Further, the particular suffixes used are not meant to imply that a particular amount of the entity exists, unless specifically indicated to the contrary. Thus, the use of reference numerals 102A-102C is not meant to imply that there are three instances of the referenced entity, and thus there could be two, three, four, or more instances in various embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As indicated in the background section above, the presence and use of mobile devices in vehicles can provide countless benefits to passengers of these vehicles, though other benefits likely exist that are not yet being exploited. Further, the presence of mobile devices in these environments also creates some new problems. For example, distracted drivers now abound who are composing, reading, and/or sending text messages (e.g., Short Message Service (SMS) messages), navigating the user interfaces (UIs) of their devices, viewing other content, etc. Additionally, other features such as streamlined route planning and setting, shared media control, customization, and/or recommendation, etc., could potentially be offered but until now are not practically feasible due to the need for customized hardware deployments, specialized applications being executed, etc. For example, both passengers and media and advertisement producers could benefit greatly from being able to easily and automatically know what users are in a vehicle and at what locations these users are located. As one example, different media could be selected or recommended for a backseat media playback device (e.g., based on who is located in the back seat) compared to the media that could be selected or recommended for a front seat media playback device (e.g., based on who is located in the front seat). As another example, before now there is not a known automated, unobtrusive way to detect the existence of multiple passengers with potentially different destinations, suggest faster routes based on all the destinations, and/or detect the ability to access carpool lanes (also referred to as high-occupancy vehicle (or "HOV") lanes, etc.) based upon determining that there are enough passengers in the vehicle, and use this capability as a factor for route planning (e.g., use the capability of accessing carpool lanes and/or the actual/projected transit times corresponding to their use or nonuse). Various embodiments disclosed herein can address (some or all of) these and other problems.

Embodiments disclosed herein can, using a mobile device—such as a telephone, tablet, smart-watch, etc.—within a vehicle, automatically determine a location of the mobile device and thus a person (or persons) within the vehicle without any knowing assistance of the person(s) and without requiring the installation or use of specialized hardware components within the vehicle. In some embodiments, the mobile device can capture one or more images via one or more optical sensors of the mobile device when the mobile device is being held or used by the user in a moving vehicle. In some embodiments, the capture occurs without any assistance from the user, and in some embodiments, without any concurrent notification to the user that the capture is taking place. The one or more images can be used as input data for a model that can be executed by the mobile device. The model can determine, based on at least the one or more images—and optionally other sensor data—the location of the person within the vehicle. The model can be generated using machine learning algorithms trained using (at least) image data—labeled with location identifiers—from one or more vehicles. In some embodiments, the model can generate different likelihoods (e.g., in the form of percentages or weights) that the person is located in one or more of the multiple locations. The determined location can be used by the mobile device to perform one or more actions (e.g., based upon a configured policy), including but not limited to activating or deactivating certain features or functionalities of the mobile device (e.g., to improve safety when the location is a driver/operator position of the vehicle), causing media to be played by a media playback device (e.g., speakers and/or video monitor of the vehicle) selected based on the determined location, transmitting the determined location data to a remote controller, etc. In some embodiments, the different likelihoods that the person is located in different locations can be used to reduce the likelihood of performing an improper action.

Embodiments can thus provide localization of a mobile device and therefore a user inside a vehicle, and in some embodiments, can further cause the mobile device to sense its surroundings to detect other mobile device users and/or other passengers of the vehicle, which can enhance the ride experience of the passengers in a variety of ways, including but not limited to security, media consumption, route selection, etc. In some embodiments, machine learning techniques can be used to determine the location of a mobile device inside a vehicle and the presence of other passengers.

In some embodiments, the model can be periodically updated and improved via continual off-line learning, e.g., using new capture data that has been verified to be accurate as additional inputs to the machine learning algorithm(s) for generating an updated version of the model to be used in mobile devices.

Accordingly, some embodiments can detect a mobile device being used by a driver in a moving vehicle and perform one or more actions in response. In some embodiments, a mobile device can be detected as being in a moving vehicle and in the proximity of other passengers (with or without a mobile device) in the vehicle, and this information (optionally along with locations of the passengers) can be used to enhance group-based personalization of shared media consumption, enhance route selection by mapping applications, etc.

Thus, some embodiments do not utilize or require any special-purpose location detection hardware, can provide high accuracy in determining which passenger (in which location/zone) is using the mobile device, and/or can detect other passengers in the car—optionally even those without mobile devices (or without compliant mobile devices). In some embodiments, some or all of the various detection techniques can be opted into by a user, perhaps during a setup/configuration of a mobile device or application, or at some point thereafter. Accordingly, these techniques can be utilized by users with their full and knowing consent, and moreover, privacy of all involved people can be maintained through various mechanisms, including having a user or purchaser (e.g., a parent purchasing a device or application for use by a child) explicitly opt in to the use of these techniques instead of having to "opt out," utilizing captured data only locally on a mobile device (instead of transmitting it to other devices/systems) and then discarded thereafter (unless consented to by the user/purchaser), etc.

FIG. 1 is a high-level block diagram illustrating a system 100 for non-intrusive intra-vehicular user location detection according to some embodiments. The system 100 includes a vehicle 126 with multiple locations 124A-124X. The vehicle 126 can be any of a variety of types of vehicles that can carry passengers, including but not limited to automobiles such as cars, trucks, or sport-utility vehicles (SUVs), buses, ships, trains, streetcars, trolley cars, airplanes, etc. The locations 124A-124X of the vehicle 126 can be locations (or "zones") in which a passenger may be located at within the vehicle.

Figure 2:
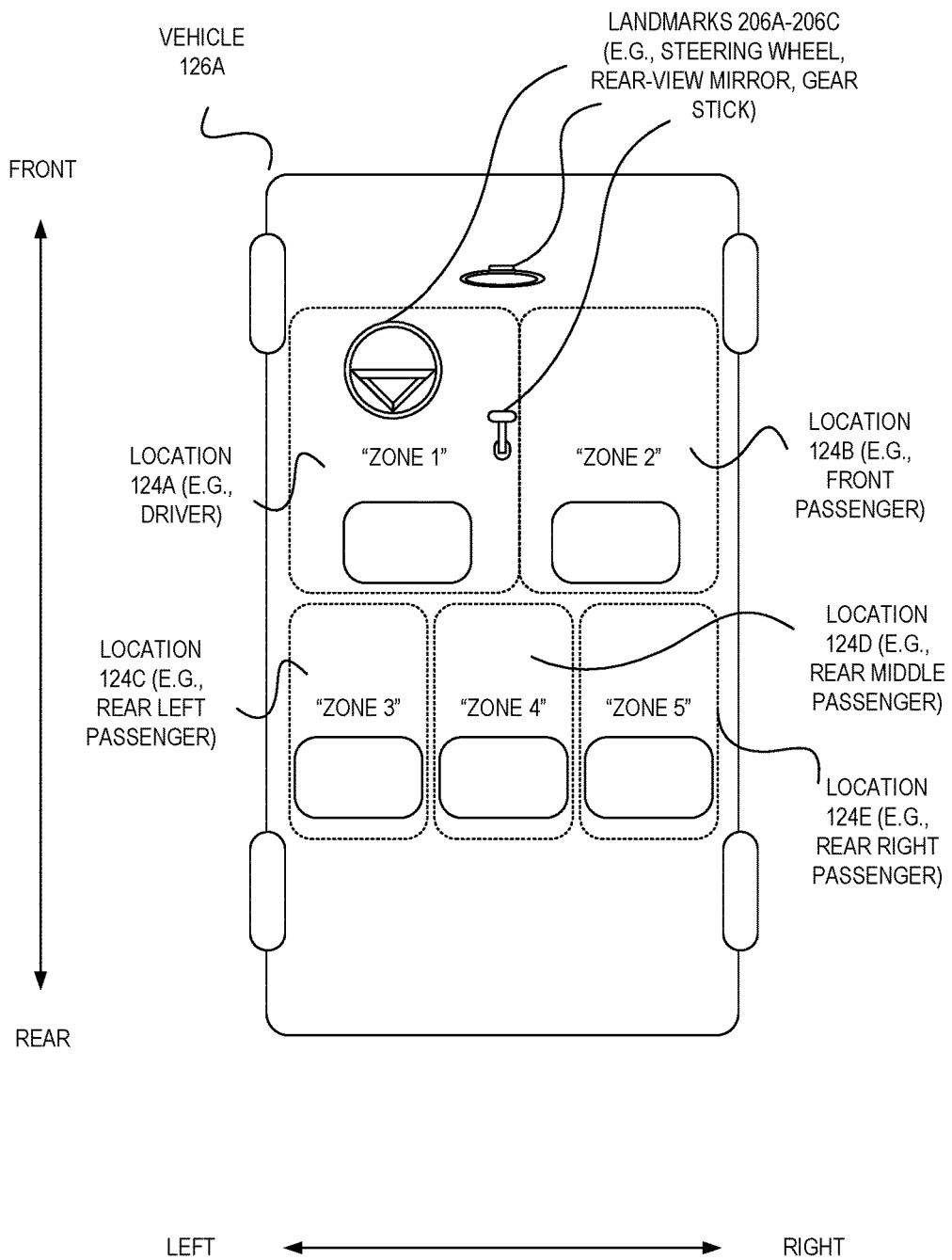
FIG. 2 is a block diagram of multiple locations of a vehicle that can be differentiated between with non-intrusive intra-vehicular user location detection according to some embodiments.

For example, FIG. 2 is a block diagram of multiple locations 124A-124E of a vehicle 126A that can be differentiated between with non-intrusive intra-vehicular user location detection according to some embodiments. In this illustrated example, the vehicle 126 that is an automobile could include five seating locations 124A-124E—a first location 124A is a driver/operator location, a second location 124B is a front passenger location, a third location 124C is a rear left passenger location, a fourth location 124D is a rear middle passenger location, and a fifth location 124E is a rear right passenger location. Of course, various other location mappings can be utilized for this type of vehicle 126A—as one example, two locations could be used that include a driver location (124A) and the rest of the vehicle could be a passenger location. Various other location mappings can be utilized for other types of vehicles 126. For example, a vehicle 126 that is a subway car could include one or more seating locations 124M-124N and one or more standing (or leaning) locations 124P-124Q. The vehicle 126 can also include one or more media playback devices 152, including but not limited to an in-dash display, an in-headrest display, a vehicle audio system, a portable electronic device, etc.

Turning back to FIG. 1, the vehicle 126 is shown as including a user 122 with a corresponding mobile device 120. The mobile device 120 includes one or more sensor components 116, which could include one or more optical sensors 118 (e.g., a front-facing camera 118A and/or a rear-facing camera 118B), audio sensors (or "microphones"), accelerometers, touchscreens, fingerprint readers, proximity sensors, ambient light sensors, gyroscopes, localization sensors (e.g., GPS units), infrared sensors, ultrasonic sensors, compass units, force sensing units, pressure sensors, infrared thermal camera sensor, contact switches, communications sensors (e.g., Wi-Fi or Bluetooth radios), environmental sensors (e.g., altitude, moisture, humidity, temperature), etc.

The mobile device 120 also includes a location module 114, which may be implemented as software, as hardware, or as a combination of both. In some embodiments where the location module 114 is implemented as software, the location module 114 can be an operating system (O/S) level component (e.g., a library integrated within or made available to an O/S), and in some embodiments the location module 114 may be a mobile application or included within (or utilized by) a mobile application—e.g., as a Software Development Kit (SDK) or library.

The location module 114 can utilize a model 112, which can be provided by a controller 102 of a computing device 110, which could be initially provided along with the location module 114 (e.g., as part of a download or installation of the location module 114) or provided after a download or installation of the location module 114—e.g., as an occasional or periodic "update." Thus, this model 112 may be periodically or occasionally updated by the controller 102.

The controller 102 can be implemented by (or within) one or more computing devices 110, and can be implemented as software, hardware, or a combination of both software and hardware. The computing devices 110 can be, for example, electronic devices such as one or more server end stations—i.e., electronic devices including components commonly used for executing software. The computing devices 110 can be part of a public or private "cloud" or data center and thus can be located in a geographically distant location from the vehicle 126, and can be accessed via one or more communication networks. Further details about exemplary interface(s) between the controller 102 and the mobile device(s) 120, as well as exemplary deployment scenarios for the controller 102 are presented in additional detail later herein regarding FIG. 8.

The controller 102 can include a training module 104, which can receive (labeled) training data 132 and use the training data 132 to generate the model 112.

Figure 3:
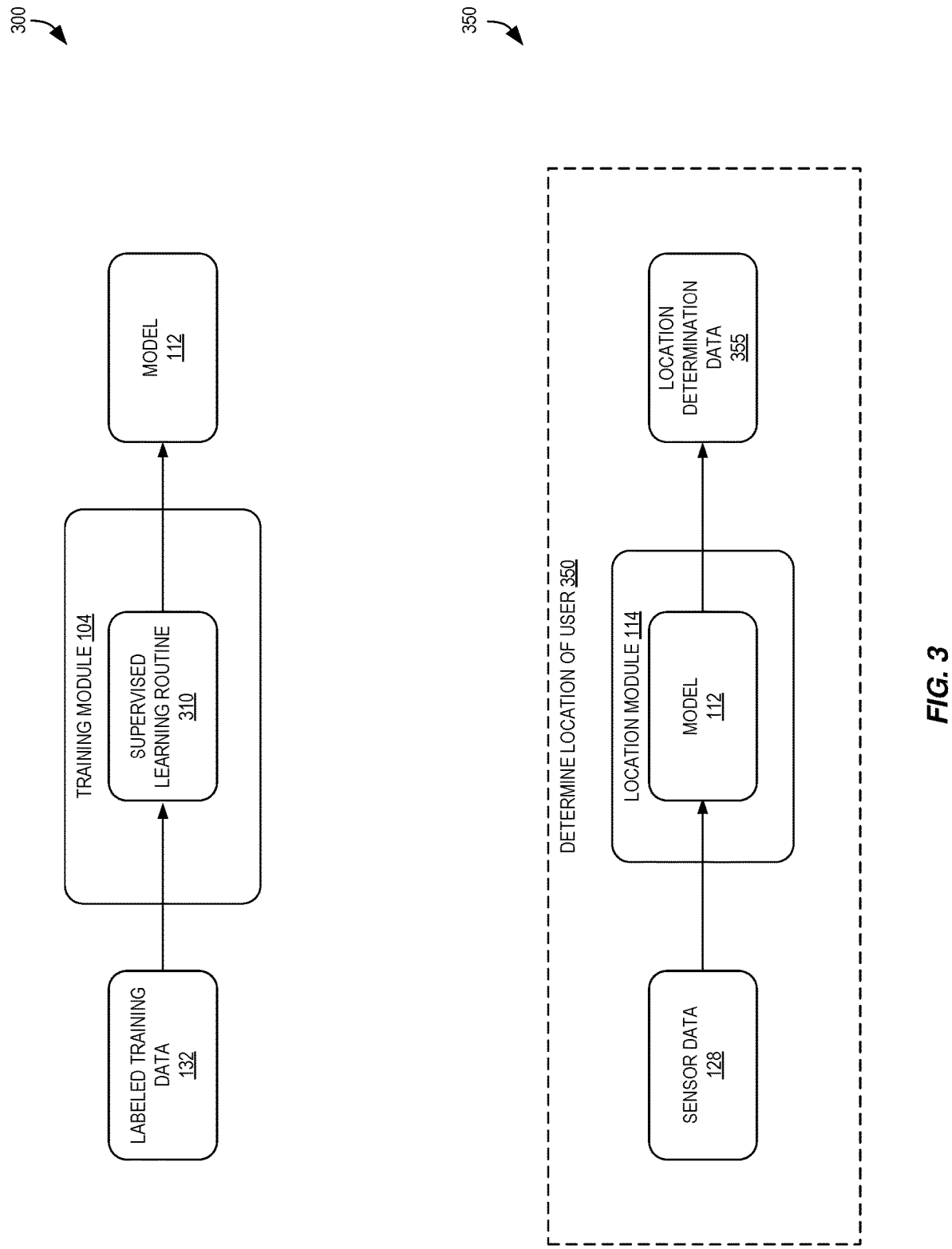
FIG. 3 illustrates a process for generating a model for non-intrusive intra-vehicular user location detection and a process for utilizing the model according to some embodiments.

For example, FIG. 3 illustrates a process 300 for generating a model 112 for non-intrusive intra-vehicular user location detection and a process 350 for utilizing the model 112 according to some embodiments. The first process 300 of FIG. 3 depicts a training phase within the inputs and outputs of a supervised learning routine 310 (e.g., a machine learning algorithm, including but not limited to one or more of a support vector machine (SVM), decision tree, logistic/logit regression, neural network, Bayes network, random forest, or other technique known to those of skill in the art that would be useful for implementing computer vision/image recognition). A supervised learning routine 310 differs from an unsupervised learning routine in that it utilizes labeled training data as opposed to unlabeled training data.

In some embodiments, the routine could be (or utilize) a reinforcement learning-based routine, which differs from the earlier-presented supervised scheme in that a reinforcement learning-based routine may not utilize labeled training data and learns in a more online manner—rather than via separate offline learning phases.

The operation of the training phase could be built with input data—i.e., labeled training data 132—comprising a large number of images taken from the inside of various vehicles of interest, each with a label indicating which location (or "zone") the picture was taken from. The training data 132 could include pictures taken from the front or/and back cameras, still frames taken from videos, and/or other sensor information. This training data 132 can be labeled as a vector of locations and probability pairs—e.g., [zone 1, probability 1; zone 2, probability 2; . . . ]—or could be simply labeled with an identifier of the particular zone that the data was acquired from (e.g., "zone 2").

Figure 4:
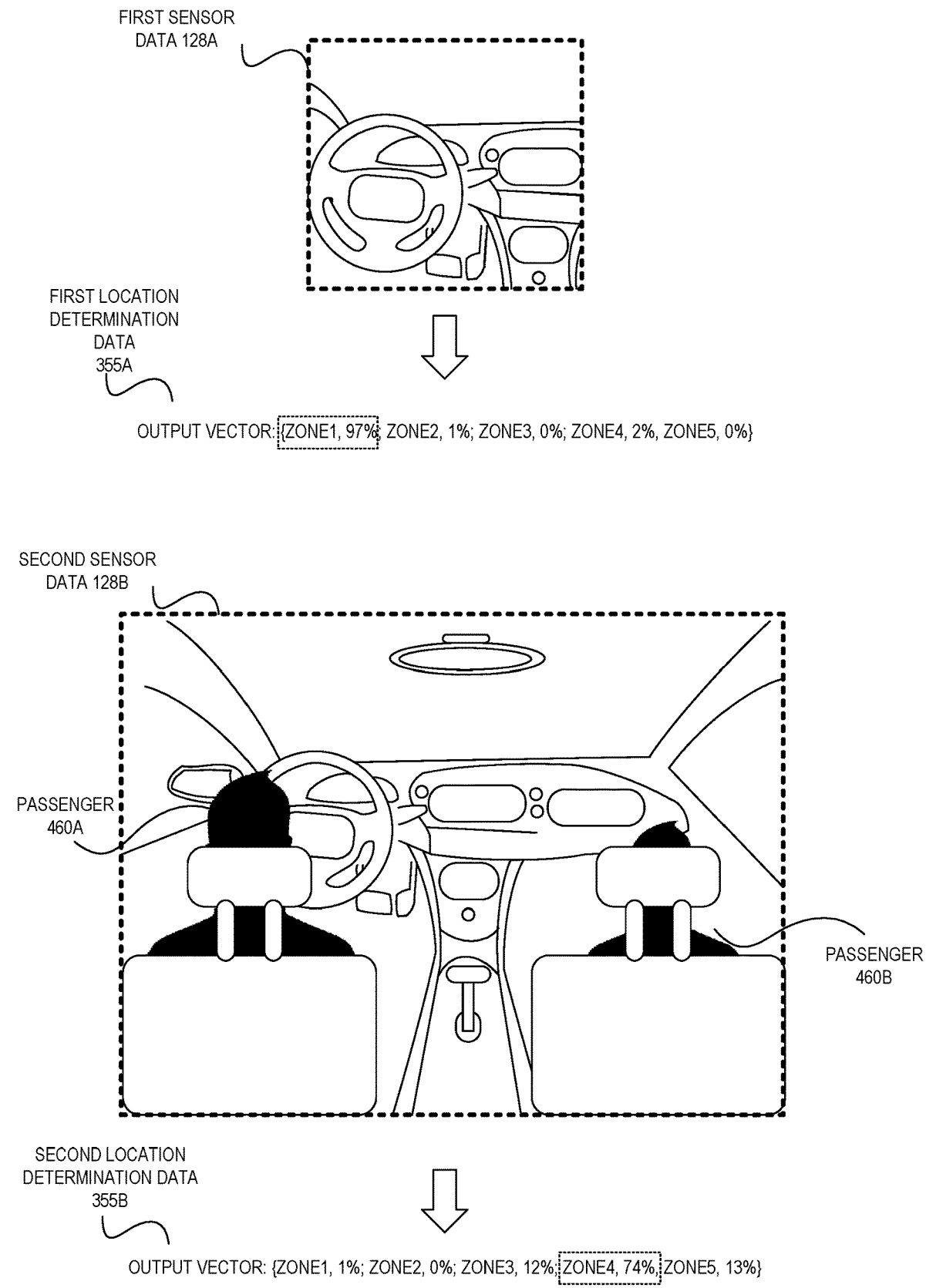
FIG. 4 illustrates first sensor data and resulting location determination data, and second sensor data and resulting location determination data according to some embodiments.

For example, FIG. 4 illustrates first sensor data and resulting location determination data, and second sensor data and resulting location determination data according to some embodiments. The first sensor data 128A represents an image captured from a rear-facing camera of a mobile device that is taken from a driver/operator location, referenced as "zone 1" in FIG. 2. In this first sensor data 128A image, the steering wheel, driver controls, and portions of the stereo, dashboard, and windshield are included. This first sensor data 128A could be labeled as being taken from "zone 1".

In contrast, second sensor data 128B from the same vehicle is shown as an image including some of the elements (or "vehicle landmarks" 206—see FIG. 2 and landmarks 206A-206C including a steering wheel, rear-view mirror, and gear stick) that are also included in the first sensor data 128A; however, the image of second sensor data 128B provides a wider view of the vehicle interior, including the rear-view mirror, the backside of a driver seat and passenger seat, a gear stick, the rear profile of a driver passenger 460A and the rear profile of another passenger 460B, etc. Thus, this second sensor data 128B was taken in a rear middle location (or "zone 4" of the exemplary vehicle of FIG. 2). This second sensor data 128B could be labeled as being taken from "zone 4."

Turning back to FIG. 3, when a large number (e.g., 100, 500, 1000, 10,000, 100,000+, etc.) of labeled training data 132 elements have been provided as inputs to the supervised training routine 310, a model 112 can be generated by the training module 104 that can be provided to one or more mobile devices 120. As indicated above, in some embodiments this model 112 is generated once and is provided to each mobile device 120 once. For example, the location module 114 could download it once, the model 112 could be installed along with the location module 114, etc. In some embodiments, the model 112 can be updated on a periodic or occasional basis, and additional versions of the model 112 can be provided to each mobile device 120. For example, the location module 114 can be configured to periodically query the controller 102 (or another entity, such as a software/update distribution system) to determine if there is a new version of the model, and download updated versions when they exist.

In some embodiments, the supervised training routine 310 can utilize captured image data (i.e., sensor data 128) from users 122 of the location module 114. For example, assuming that a user 122 consents to providing this data to help improve the system, the location module 114 may provide captured images, which were used by the location module 114 to determine a location of the user 122, to the training module 104 as feedback data 133. This feedback data 133 can include labels provided by the user 122, perhaps by the user confirming that a "predicted" location (from the location module 114) associated with the data is correct, by manually inputting the location of the data, etc. In some embodiments, the data can be labeled without input from the user. For example, the location module 114 may determine that the location is extremely likely to be correct when it generates a percentage confidence value meeting or exceeding a threshold amount, and in this case, send the image data as feedback data 133 to the training module 104. In some embodiments, such feedback data 133 can be labeled (or the labels can be confirmed) by other machine learning processes or by human users before further use by the training module 104. The feedback data 133 may be anonymized to protect user privacy by ensuring that the user cannot be identified from the feedback data 133.

The location module 114 may use the model 112 and potentially other data to determine the likely location of a user in a vehicle. For example, process 350 includes sensor data 128 being inputted to the location module 114. The sensor data 128 can include images captured by one or more optical sensors 118—e.g., pictures captured by a front-facing camera 118A and/or rear-facing camera 118B. The sensor data 128 can also include other sensor data, including but not limited to recorded audio from a microphone, touch data (which can indicate whether zero, one, or two hands/digits of the user 122 are concurrently on the phone; a presence of two hands on the phone may indicate an increased likelihood that a the user may be composing text messages), temperature data (which could indicate whether a phone is docked (relatively cold) or being held (relatively warm)), recent accelerometer data, etc.

Using this sensor data 128 as input values, the location module 114 can execute the model 112 to generate location determination data 355. In some embodiments, the location determination data 355 comprises an indicator of the predicted location. In some embodiments, the location determination data 355 comprises a vector (or matrix or any other data format capable of similar data representation) of identifiers of the potential locations and corresponding percentage likelihoods or weights that the mobile device is in each such location.

As one example, the location determination data 355 may comprise: [zone 1, 70%; zone 2, 10%; zone 3, 0%; zone 4, 20%; zone 5, 0%; unknown, 0%]. In this case, the location module 114 has determined that the sensor data 128 was likely acquired from zone 1 (or "location 1") with a seventy-percent certainty, from zone 2 with a ten-percent certainty, and from zone 4 with a twenty-percent certainty. As shown, the location determination data 355 may also comprise, in addition to each location-percentage pair, an "unknown" location and a corresponding percentage value to reflect scenarios when the location module 114 cannot determine that a part (or all) of the sensor data 128 indicates a user is positioned in any of the known locations.

For another example, we return to FIG. 4. In this illustrated example, it may be the case that a rear-facing camera 118B acquired the first sensor data 128A, which is provided as an input to the model 112, and leads to the following first location determination data 355A: [zone 1, 97%; zone 2, 1%; zone 3, 0%; zone 4, 2%; zone 5, 0%]. As shown with a dashed box, the first location ("zone 1"—which in this case corresponds to a driver's seat) can be determined to be the location of the user.

This determination can occur using a variety of algorithms. One simple algorithm (or "determination condition")

includes simply selecting the location having the highest certainty percentage as the location, and if no such location exists, determining that the position is unknown. An unknown position can result in an action of, for example, acquiring new sensor data 128 and predicating the location again. Another simple algorithm may be to select the location having the highest certainty percentage as the location only if that percentage value meets or exceeds a configured threshold (e.g., 50%, 66%, 75%, 90%, 99%), and if no such location exists, determining that the position is unknown.

As another example, we assume that a rear-facing camera 118B acquired the second sensor data 128B, which is provided as an input to the model 112, and leads to the following second location determination data 355B: [zone 1, 1%; zone 2, 0%; zone 3, 12%; zone 4, 74%; zone 5, 13%]. As shown with a dashed box, the fourth location ("zone 4"—which in this case corresponds to a rear middle seat) can be determined to be the location of the user, assuming that the value of 74% satisfies the determination condition.

With the determined location, one or more of a variety of actions can be performed—in whole or in part—by the mobile device 120. For example, the mobile device 120 may send the determined location information (as action message 150) to a remote entity such as the controller 102, a mapping service module 106, central media controller ("CMC") 108, etc. The mobile device 120 could also cause a functionality of the device to be enabled (e.g., a voice navigation/control system) or disabled (e.g., a communication application). The mobile device 120 could also cause the vehicle 126 to perform an action (e.g., issue a command as an action message 150—perhaps via a wired or wireless communication—to cause the vehicle 126 to change the volume of a playback device, stop a playback device, present certain content via speakers and/or a display, etc.), etc.

Figure 5:
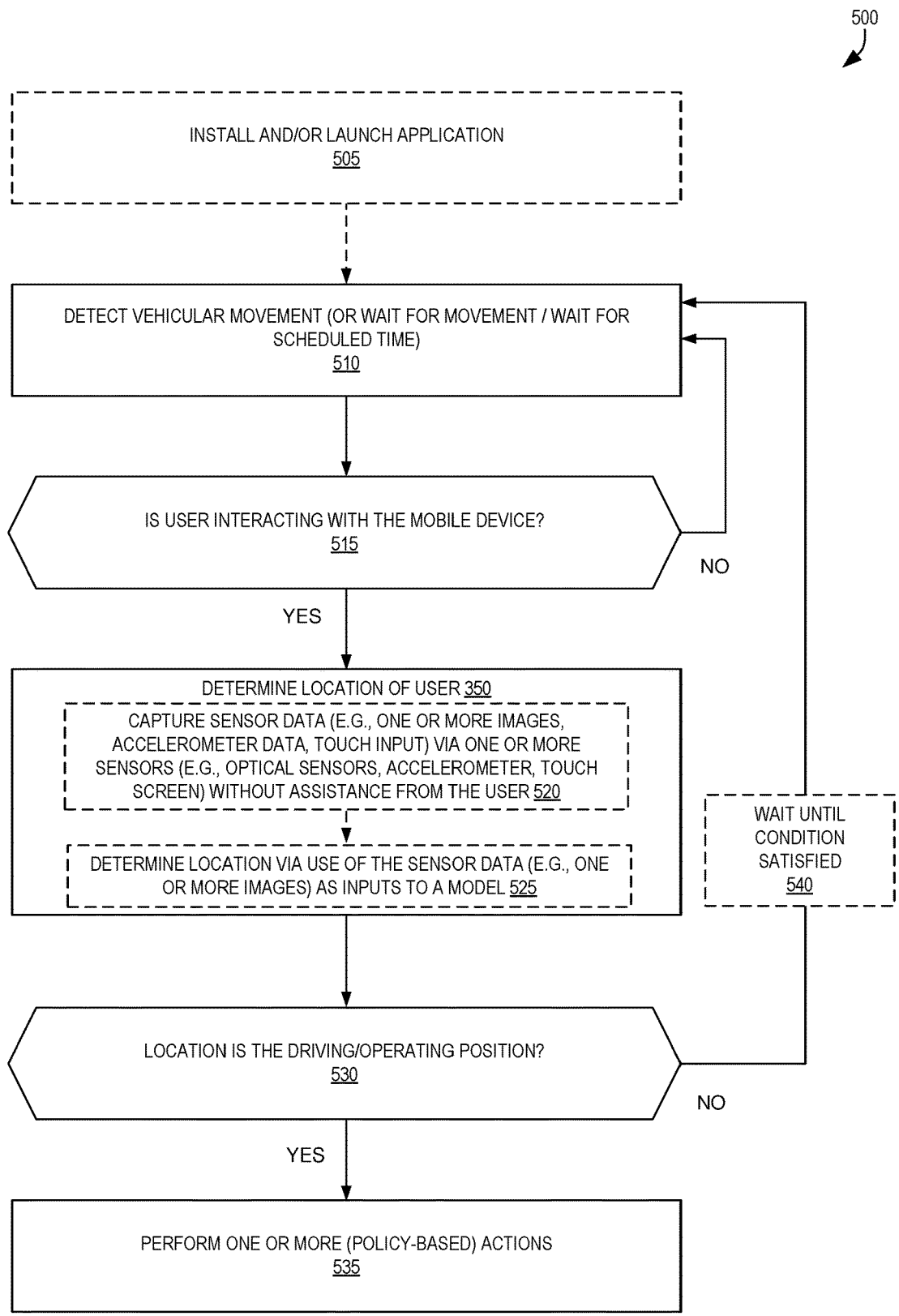
FIG. 5 is a flow diagram illustrating operations for vehicle operation detection and resultant safety actions according to some embodiments.

By way of example, several applications of the system will now be described. FIG. 5 is a flow diagram illustrating operations 500 for vehicle operation detection and resultant safety actions according to some embodiments. The operations in the flow diagrams will be described with reference to the exemplary embodiments of the other figures. However, the operations of the flow diagrams can be performed by embodiments other than those discussed with reference to the other figures, and the embodiments discussed with reference to these other figures can perform operations different than those discussed with reference to the flow diagrams. Some or all of the operations 500 can be performed, for example, by the mobile device 120 as described herein.

This use case allows for quick and non-invasive (e.g., no need for an external hardware device, and/or no need for any special user input to be provided from the user) detection of a condition when an active mobile user is operating a vehicle. In some embodiments, the detection of this condition can be used to enforce various actions for enhanced safety. For the purpose of discussion, we will assume that the involved mobile device is a smartphone, though this flow of operations 500 also applies for other types of mobile devices.

Optionally, at block 505, the operations 500 include installing or launching a particular application. For example, an application for a smartphone can be installed (or part of the base mobile O/S) and execute, having access to at least one sensor device (e.g., camera), and optionally have access to control other features of the smartphone—e.g., texting, calling, browsing, etc.

The operations 500 further include, at block 510, detecting vehicular movement—e.g., the application can sense whether the smartphone is in a moving vehicle. Many techniques are known to those of skill in the art for implementing this determination. As one example, most modern smartphones are equipped with an accelerometer that can detect the handset's movement in a direction, e.g., 4.5 m/s. Thus, in some embodiments, determining whether the mobile device is in a moving vehicle can include determining whether a detected speed (e.g., via an accelerometer) meets or exceeds a threshold value, e.g., which could be selected to indicate a speed that is greater than a speed of a person walking, in order to avoid a false positive due to a person walking and using their phone, etc. Additionally or alternatively, other mobile device sensors and/or network-based methods can also be used to detect that a mobile device is moving because it is inside a moving vehicle.

The operations 500 further include, at decision block 515, determining whether the user is actively interacting with the mobile device. In some embodiments, this block 515 can be checked every time movement is detected (see block 510) or every time the user interacts with the mobile device (e.g., to answer a received SMS or to send one), though of course the checking can occur with other frequencies. This block 515 returns true (YES) if the mobile device is in a moving vehicle (based upon block 510) and the user is interacting with it. Determining whether the user is interacting with the mobile device can include determining that a physical user input has been provided—e.g., a button of the mobile device has been pressed, a touchscreen has been pressed, the phone has been moved to an angle (e.g., near vertical, approximately 45 degrees, between 20 and 90 degrees, etc.) that is a common angle of a mobile device when it is being used (e.g., as detected by a gyroscope sensor), a person's face is detected via a front-facing camera 118A, etc. If the block returns false (NO), the flow may continue back to block 510.

However, upon a YES determination, the flow can continue to perform block 350—determining an intra-vehicle location of the user. Block 350 can optionally include blocks 520 and 525. At block 520, the flow can include capturing sensor data (e.g., one or more images) via one or more sensors (e.g., optical sensors) without assistance from the user. In some embodiments, the capturing may include notifying the user that the capture is taking place, but in many embodiments the capturing may be "invisible" to the user—e.g., the GUI is not updated to indicate to the user that the capture is occurring. Thus, in some embodiments, the user is not distracted by such notifications (which is extremely important, as the goal of not distracting the driver from the operation of the vehicle can be an important goal), and can continue performing whatever actions the user desires. Additionally, privacy can be maintained in some embodiments by performing the location determinations locally—i.e., at the mobile device 120—and the input data (e.g., image capture data) may be discarded by the mobile device 120. Thus, the sensor data 128 need not be sent away from the mobile device to other devices, eliminating the ability for external actors to make malicious use of this potentially-sensitive data. However, in some embodiments, the user may consent to providing sensor data 128 as feedback 133 to improve the determinative ability of the system, and thus some or all of the sensor data 128 may be transmitted by the mobile device 120. At block 525, the flow can include determining the location via use of the sensor data (e.g., one or more images) as inputs to a model 112.

The operations 500 further include, at decision block 530, determining whether the location is a driving or operating position of the vehicle. If not, the flow can continue (directly or indirectly via optional block 540) back to block 510, as a person that is not driving does not require additional safety measures to be deployed. In some embodiments, this path optionally includes block 540, where the flow can include waiting until a condition is satisfied before going back to block 510. The condition could include, for example, waiting an amount of time, waiting until there is no detected user interaction with the mobile device for an amount of time, etc.

When the flow continues to block 535, the condition has been detected that the mobile device user is also the driver of the vehicle (e.g., the detected location is "zone 1"). Thus, at block 535, the flow includes performing one or more policy-based actions, which could be set by the application's administrator or manufacturer, by the user (at an earlier time), etc. For example, the one or more actions could include one or more of: blocking the phone (and/or certain applications or hardware/software functions) from being used by the user, transmitting a notification message (e.g., SMS, email, voice call, etc.) to another person such as a parent of the user, sending a notification message to an authority (e.g., police station), proposing a voice-control functionality (e.g., voice-to-text feature), triggering an auto-assistant functionality by proposing one or more reply text options and having the driver verbally approve one of the options or dictate a different reply, etc.

Additionally, some embodiments can determine the position and surroundings of a mobile device—such as other mobile device users, other passengers, children, animals, etc.—in a vehicle. This information can be very useful for use cases described herein, especially when combined with known preferences and/or demographics information of the mobile user(s).

Figure 6:
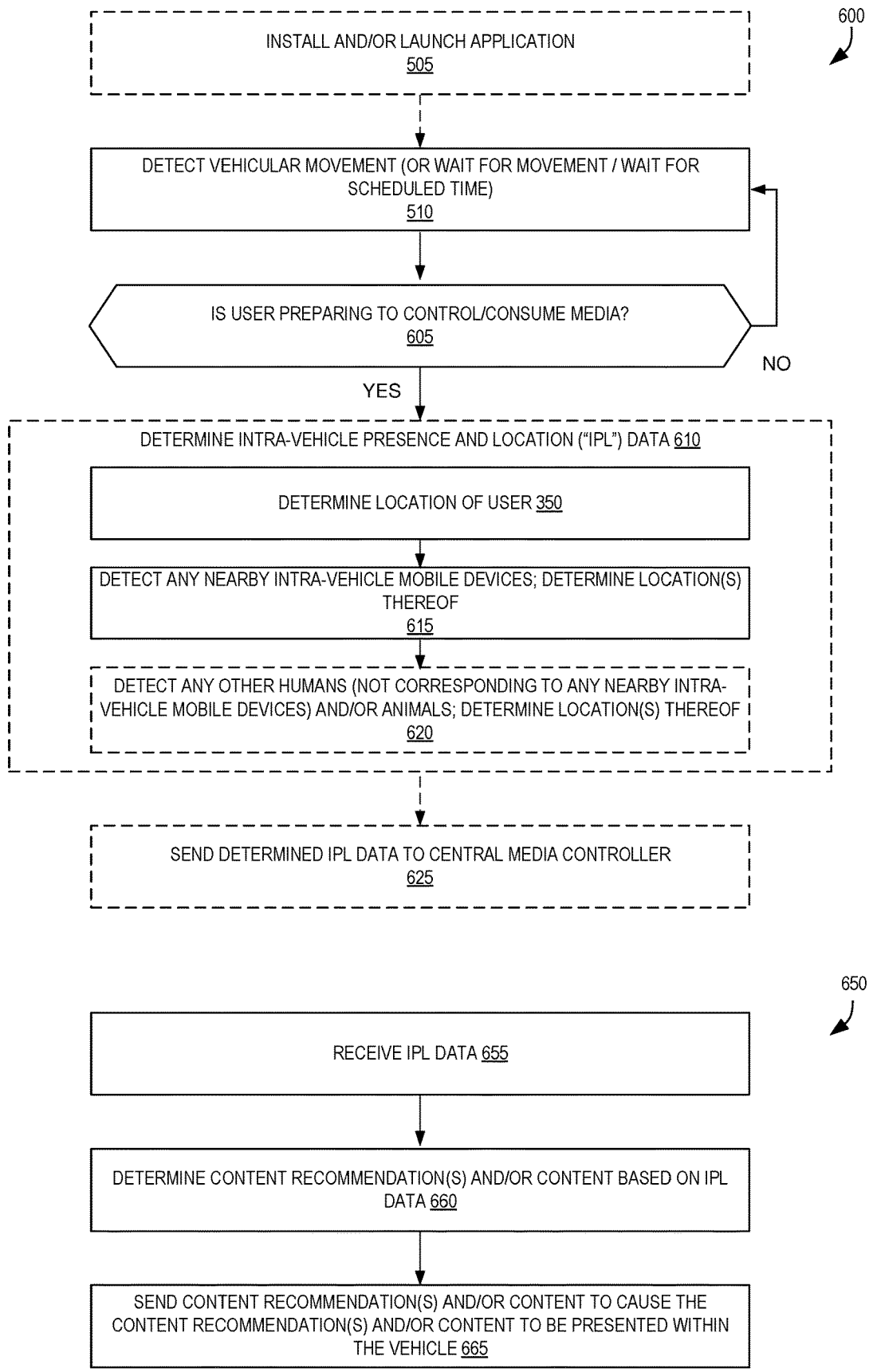
FIG. 6 is a flow diagram illustrating operations for determining and reporting intra-vehicle presence and location data, and operations for using intra-vehicle presence and location data for determining content or recommendations according to some embodiments.

For example, FIG. 6 is a flow diagram illustrating operations 600 for determining and reporting intra-vehicle presence and location data, and operations for using intra-vehicle presence and location data for determining content or recommendations according to some embodiments. The operations 600 of the first flow can be performed, for example, by the mobile device 120 as described herein; the operations 650 of the second flow can be performed, for example, by the controller 102 and/or central media controller 108 as described herein.

This use case can provide an enhanced media sharing experience (e.g., for suggested/recommended media, targeted advertisements, adjusting sound and/or brightness levels of display device(s) or of the vehicle itself, etc.) that suits multiple or all passengers in a given vehicle. For the purposes of FIG. 6, we assume that the involved mobile device is a smartphone, though the operations can involve other types of mobile devices.

The operations 600 optionally include block 505, where a smartphone application is installed (or is part of the base mobile O/S) and is running with access to at least one camera (optical sensor), and the ability to control the mobile device's media browsing features. This could also include controlling an external media playback device (e.g., a media playback device 152 that is part of the vehicle such as an in-dash display, in-headrest display, a vehicle audio system, a portable electronic device), which could occur using wired or wireless connectivity (e.g., Bluetooth) with a cooperative application running on that external device. At block 510, the application senses if a first mobile device is in a moving vehicle. For example, the mobile device can be determined to be moving with a certain speed (e.g., from the device's accelerometer). This information could further be paired with a snapshot of the cameras (using the model to determine if a known vehicle location is predicted) and/or detecting the pairing of the mobile device with a car manufacturer's in-vehicle Bluetooth device. In some embodiments, block 510 can also include sending GPS coordinates of the mobile device to a CMC 108—described later herein—for future use.

The operations 600 further include, at decision block 605, determining whether the user is preparing to control/consume media. This block 605 can return true (YES) if the first mobile user is in a vehicle and is preparing to consume media that will be shared (e.g., connected to a vehicle's Bluetooth device, accessing speakers, accessing video displays). This preparation can include opening a media playing application or subcomponent thereof, among other things known to those of skill in the art. When the block 605 returns false (NO), the flow can continue back to block 510.

When the block 605 returns true, flow can continue to block 610, which includes determining intra-vehicle presence and location ("IPL") data. Block 610 can include blocks 350, 615, and/or 620.

Block 350 includes detecting the location of the first mobile user in the car, as described throughout this application. In some embodiments, this location information is transmitted to the CMC 108, possibly along with location-based information (e.g., GPS coordinates).

Block 615 includes detecting any nearby intra-vehicle mobile devices; and determining the intra-vehicle location(s) thereof. Thus, in some embodiments the flow includes detecting whether any other mobile device users are in the same vehicle. This can be done, for example, by using the mobile device's Radio-frequency identification (RFID) capabilities (e.g., a near field communication (NFC) transmitter) to discover other mobile devices (e.g., running the same application or otherwise compatible with this application). If RFID for distances of up to 1.5 meters is not available, the location (e.g., GPS information collected periodically described earlier herein) of the other mobile users running the application could be used to determine their vicinity and hence if they are in the same vehicle. In some embodiments, the other mobile devices could have self-identified their own locations (e.g., by using optical sensor data as an input to a model 112) and transmit an identifier of that location to the first mobile device. In some embodiments, this information can be sent to the CMC 108, perhaps along with location-based (e.g., GPS) information if available.

The operations 600 further optionally include, at block 620, detecting any other humans (not corresponding to any nearby intra-vehicle mobile devices) and/or animals; and determining the location(s) thereof. In some embodiments, another model 112 can be trained using labeled images of children, and/or dogs, and/or adults, etc., located in a vehicle, and/or trained using audio data taken in vehicles including children, dogs, adults, etc. This other model 112 can be trained using image recognition techniques known to those of skill in the art—for example, using the Open Source Computer Vision (OpenCV) library for computer vision or TensorFlow™ machine learning library—and/or can be trained using speech/sound recognition techniques known to those of skill in the art—for example, the Kaldi speech recognition toolkit.

This "other" model 112 can be used by the mobile device with, as input(s), one or more images captured from the optical sensor(s) 118 and/or one or more audio recordings, to thus identify the presence of other people, animals, and/or objects. The "other" model 112 may return a list of passengers/objects, with optionally their corresponding intra-vehicular location. In some embodiments, this information can be transmitted to the CMC 108.

In some embodiments, block 625 includes sending some or all determined IPL data to the CMC 108. Thus, in embodiments using block 625, the preceding blocks may not send intermediate data separately, and instead, all data can be combined and sent at once at block 625.

In some embodiments, the IPL data may not be sent and thus block 625 may not be performed. As one example, the IPL data can be provided to a local media consumption application, which may have a profile for the user and can use the profile data together with the IPL data for suggesting media, playlists, etc.

The second flow of operations 650 can be performed by a CMC 108 of controller 102. At block 655, the second flow includes receiving the IPL data (e.g., sent at block 625), and at block 660, determining content recommendation(s) and/or content based on the IPL data.

In some embodiments, block 660 includes correlating the IPL data to determine the demographics and locations in the vehicle of the various passengers, and prepares a list of recommendations for media (e.g., music, video, etc.) and/or targeted advertisements for that group. In some embodiments, depending on the number of media display devices of the vehicle or in the vehicle—e.g., one video display for backseat passengers, one video display for the front seat—the CMC 108 can create multiple "groups" of users in the same vehicle, and can prepare separate recommendations for each group.

Additionally, in some embodiments the IPL data can be used to better adjust a vehicle's media display and/or sound devices. For example, if a young child or pet is detected in one zone, the CMC 108 (or the mobile device 120) can cause the media device(s) to automatically turn down the volume of the speakers (e.g., near the child or pet, or in the whole vehicle).

In some embodiments, the first flow operations 600 and second flow operations 650 can be simplified by just detecting the proximity of the mobile devices inside the same moving vehicle, and offering one consolidated recommendation for media content and/or targeted ads. However, an added benefit of using the machine-learning models described herein (e.g., in block 610) can further enhance the concept by providing custom features for vehicles having more than one media display device.

At block 665, the second flow includes sending content recommendation(s) and/or content (e.g., to the mobile device(s) in the vehicle, or to a component of the vehicle itself) to cause the content recommendation(s) and/or content to be presented within the vehicle.

Additionally, some embodiments can determine the presence and/or location of passengers in a vehicle, and use this information to determine better vehicle routing options (e.g., by mapping applications).

Figure 7:
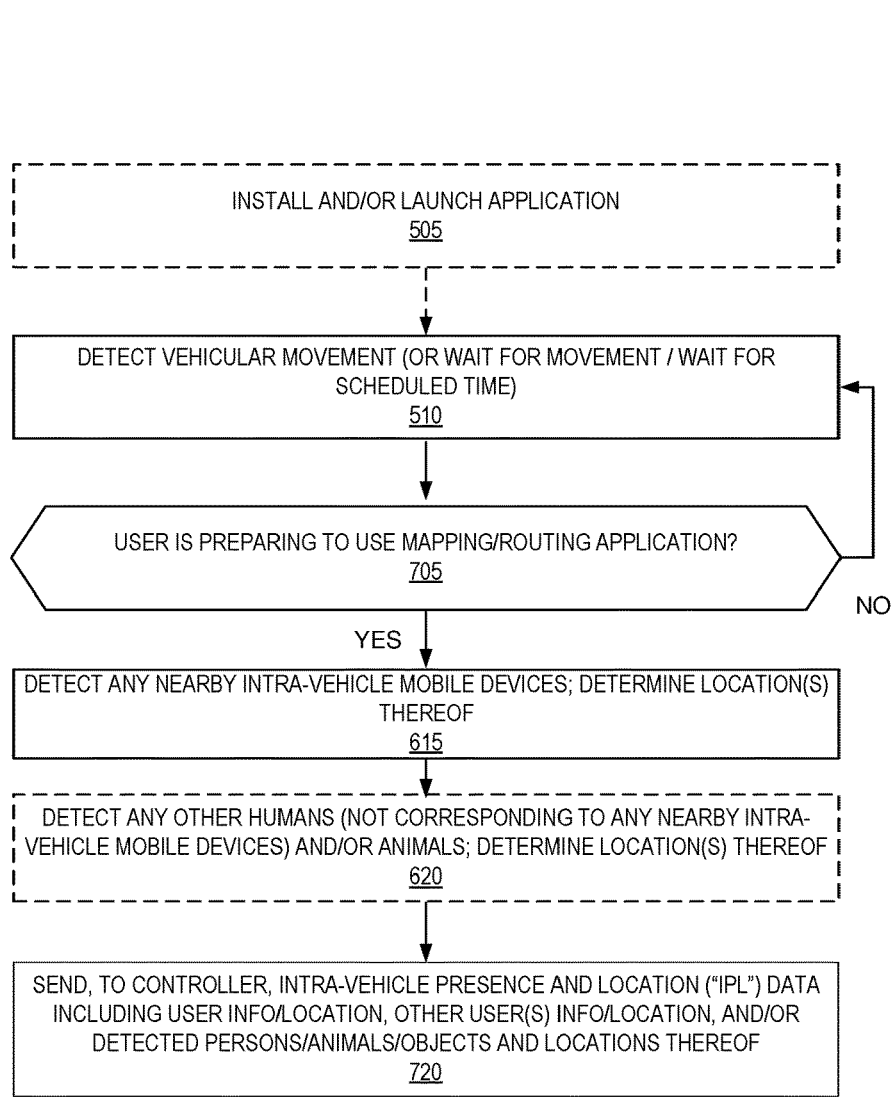
FIG. 7 is a flow diagram illustrating operations for determining intra-vehicle presence and location data, and operations for utilizing this data for route planning according to some embodiments.
Figure 7:
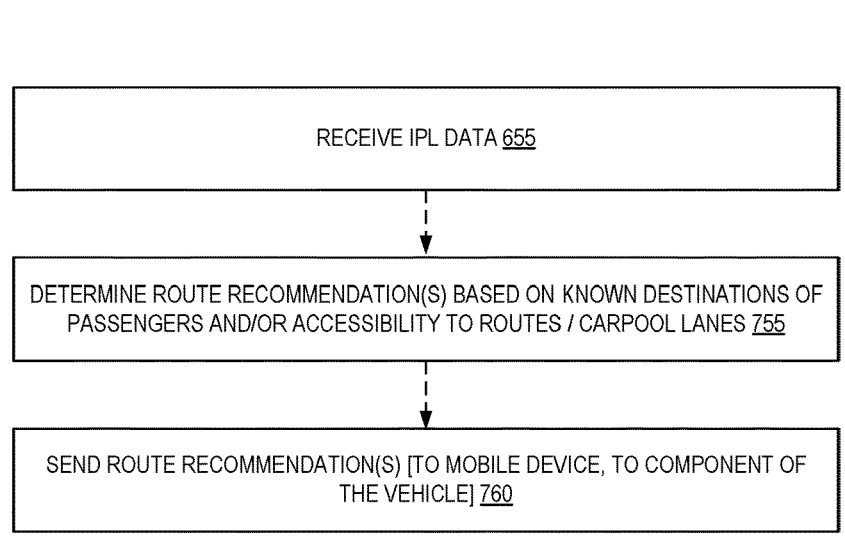

For example, FIG. 7 is a flow diagram illustrating operations 700 for determining intra-vehicle presence and location data, and operations 750 for utilizing this data for route planning according to some embodiments. The operations 700 of the first flow can be performed, for example, by the mobile device 120 as described herein; the operations 750 of the second flow can be performed, for example, by the controller 102 or mapping service module 106 as described herein. For the purpose of discussion, we will assume that the involved mobile device is a smartphone, though these operations can also apply for other types of mobile devices.

The operations 700 can begin similarly as the flows of FIG. 5 and FIG. 6, with optional block 505 and block 510.

As part of block 505, a smartphone application can be installed (or provided as part of the base mobile O/S) and will execute and have access to at least one camera (optical sensor), and/or access to control a mapping application. In some embodiments, the mapping application can be integrated together with the location module 114 in an application, though in other embodiments they are distinct applications that can interact, e.g., via the O/S, using an Application Programming Interface (API), etc. At block 510, the location module 114 can sense if a first mobile device is in a moving vehicle. For example, the mobile device can be determined to be moving with a certain speed (e.g., from the device's accelerometer). This information could further be paired with a snapshot of the cameras (using the model to determine if a known vehicle location is predicted) and/or detecting the pairing of the mobile device with a car manufacturer's in-vehicle Bluetooth device. In some embodiments, block 510 can also include sending GPS coordinates of the mobile device to a mapping service module 106—described later herein—for future use.

The operations 700 further include, at decision block 705, determining whether the user is preparing to use mapping/routing application. A variety of techniques can be utilized for this determination, including registering with the O/S to be notified upon a launch of the mapping application, "listening" for certain system events, watching log files, receiving a message from the mapping application, etc. In some embodiments, block 705 will return true (YES) and the operations can continue to block 615 when the first mobile user is in a moving vehicle and is preparing to access (or is actively accessing) the mapping application or a functionality/module thereof; otherwise, the flow can continue back to block 510.

The operations 700 further include, at block 615, detecting any nearby intra-vehicle mobile devices, and determining the intra-vehicle location(s) thereof. Thus, in some embodiments the flow includes detecting whether any other users with other mobile devices are in the same vehicle, as described above with regard to FIG. 6.

The operations 600 further optionally include, at block 620, detecting any other humans (not corresponding to any nearby intra-vehicle mobile devices) and/or animals; and determining the location(s) thereof. These operations can occur as described above with regard to FIG. 6.

In some embodiments, the operations 700 further include block 720, and sending, to controller 102 and/or mapping service module 106, intra-vehicle presence and location ("IPL") data including user info/location, other user(s) info/location, and optionally a list or indication of detected persons/animals/objects and locations thereof.

The second flow of operations 750 can be performed by a mapping service module 106 of controller 102. At block 655, the second flow includes receiving the IPL data (e.g., sent at block 720), and at block 755, determining route recommendation(s) based on known destinations of passengers and/or accessibility to routes/carpool lanes.

For example, if multiple people are determined to be in the vehicle, the mapping service module 106 can consider route segments including carpool/HOV lanes that typically require at least 2, at least 3, etc., passengers within the vehicle in order for the lane(s) to be accessed (or accessed during certain hours, or accessed at a smaller expense). Accordingly, the mapping service module 106 can include the use of such lanes—when applicable—optionally along with the different transit speeds and/or required cost/tolls of these lanes, when considering different route options.

In some embodiments, the mapping service module 106 can identify a set of destinations associated with those users in the vehicle—e.g., from the users explicitly indicating these destinations in their own calendar/mapping software, from a detected pattern of destinations at particular days/ times over a history of trips, etc. Thus, the mapping service module 106 can determine optimal routes using all of this destination information in a non-intrusive manner—i.e., a driver could be provided the optimal route without having to do any manual, time-consuming, and/or dangerous user input for each of the destinations.

In some embodiments, the mapping service module 106 can use both the set of destinations as well as the ability to access carpool lanes for determining an optimal route. As a result, in some cases the order of destinations could be changed based upon having access to carpool lanes while there are a sufficient number of passengers in the vehicle, even though this order of destinations might not otherwise be selected—e.g., the total distance might be longer than another route (although it could be much faster, more cost-effective, etc.).

At block 760, the second flow includes sending route recommendation(s), e.g., to one or more of the mobile device(s) in the vehicle, or to a component of the vehicle itself such as an in-dash display unit to cause the route recommendation(s) to be presented or used.

Various other use cases abound for the non-intrusive techniques for fine-grained intra-vehicular mobile user location detection described herein; thus these use cases are to be viewed as illustrative and not limiting. Additionally, these three example use cases could be implemented in different variations. They can also be combined, for example the mapping application could restrict the interaction with the phone once a vehicle is in movement and it was detected to be in the driver's zone, for example.

Figure 8:
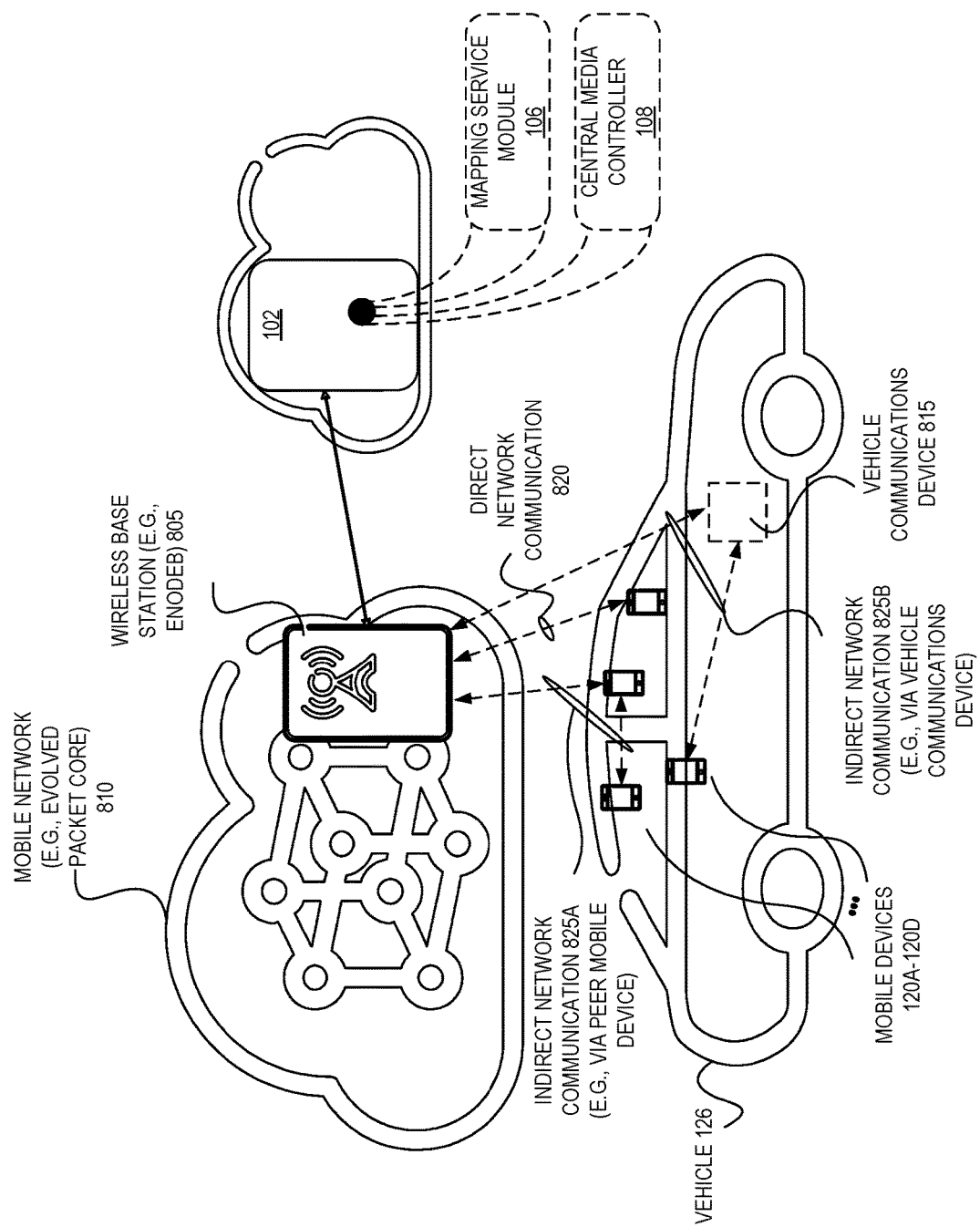
FIG. 8 is a block diagram illustrating various network communication paths between mobile devices and a controller utilized in some systems for non-intrusive intra-vehicular user location detection according to some embodiments.

FIG. 8 is a block diagram illustrating a system 800 including various network communication paths between mobile devices and a controller utilized in some systems for non-intrusive intra-vehicular user location detection according to some embodiments.

Various low-level connectivity techniques for the various mobile devices are known to those of skill in the art and thus are presented in great detail for the sake of clarity. For example, a set of mobile phones (i.e., mobile devices 120A-120D) in a vehicle 126 could be directly connected to a controller 102 (and/or CMC 108 and/or mapping service module 106) via cellular connectivity, as shown via direct network communication 820 path, which flows from the mobile devices 120A-120D to a wireless base station 805 (e.g., a "NodeB" or "eNodeB"), through a mobile network 810 (e.g., an Evolved Packet Core (EPC)), and via one or more packet-based networks (e.g., the Internet) to the controller 102. Other communication techniques could be employed in different embodiments between the vehicle 126/mobile devices 120A-120D and the controller 102, including but not limited to satellites, Wi-Fi, etc.

Additionally, one or more of the mobile devices 120A-120D could use a first indirect network communication 825A path—e.g., via another peer mobile device—or a second indirect network communication 825B path—e.g., via a vehicle communications device 815. For example, the another peer mobile device or vehicle communications device 815 could provide access to the controller 102 (via cellular communications with a wireless base station 805) by providing a local intra-vehicle Wi-Fi network (e.g., one of the Institute of Electrical and Electronics Engineers (IEEE) 802.11 standards) or Bluetooth connection. Similarly, a media display device (not illustrated) within the vehicle 126 can similarly access the controller 102.

Notably, in some embodiments, the controller 102 (and/or central media controller (CMC) 108/mapping service module ("MServ") 106 function can be implemented in an edge cloud (e.g., within mobile network 810) as opposed to elsewhere (e.g., within a more traditional public cloud or data center) in another network.

Figure 9:
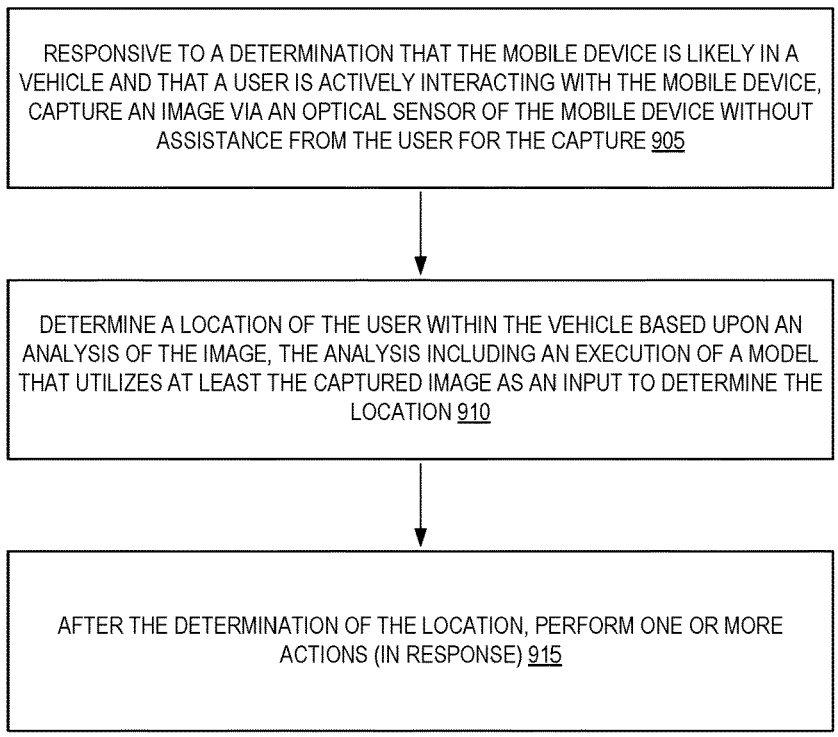
FIG. 9 is a flow diagram illustrating operations for non-intrusive intra-vehicular user location detection according to some embodiments.

FIG. 9 is a flow diagram illustrating operations for non-intrusive intra-vehicular user location detection according to some embodiments. The operations 900 of this flow can be performed, for example, by the location module 114 and/or mobile device 120 as described herein.

The operations 900 include, at block 905, responsive to a determination that the mobile device is likely in a vehicle and that a user is actively interacting with the mobile device, capturing an image via an optical sensor of the mobile device without assistance from the user for the capture. The operations 900 further include, at block 910, determining a location of the user within the vehicle based upon an analysis of the image, the analysis including an execution of a model that utilizes at least the captured image as an input to determine the location. The operations 900 further include, at block 915, after the determination of the location, performing one or more actions (in response).

Figure 10:
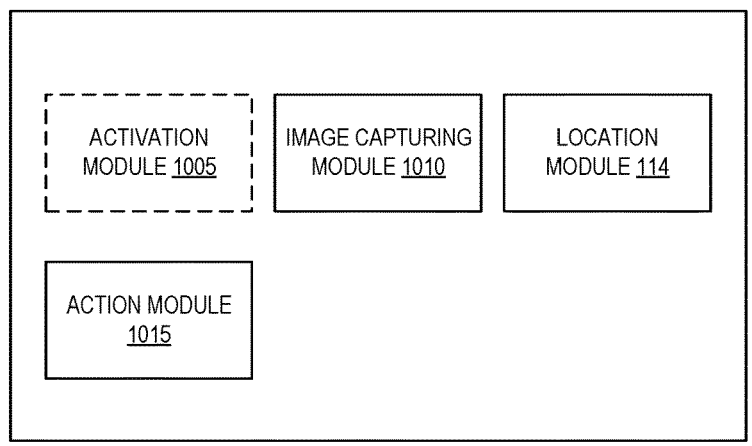
FIG. 10 is a block diagram illustrating components of one or more devices implementing a controller that can be used in some systems for non-intrusive intra-vehicular user location detection according to some embodiments.

FIG. 10 is a block diagram illustrating components of one or more electronic devices 1000 that can be used in some systems for non-intrusive intra-vehicular user location detection according to some embodiments.

With regard to FIG. 10, the electronic device(s) 1000 can be a mobile device that can include an activation module 1005, an image capturing module 1010, a location module 114, and/or an action module 1015.

The activation module 1005 can be adapted for determining that a mobile device is likely in a vehicle and that a user is actively interacting with the mobile device.

The image capturing module 1010 can be adapted for, responsive to a determination that the mobile device is likely in a vehicle and that a user is actively interacting with the mobile device (which could be performed by the activation module 1005), capture an image via an optical sensor of the mobile device without assistance from the user for the capture.

The location module 114 can be adapted for determining a location of the user within the vehicle based upon an analysis of the image, the analysis including an execution of a model that utilizes at least the captured image as an input to determine the location.

The action module 1015 can be adapted for, after the determination of the location, performing one or more actions (in response).

Figure 11:
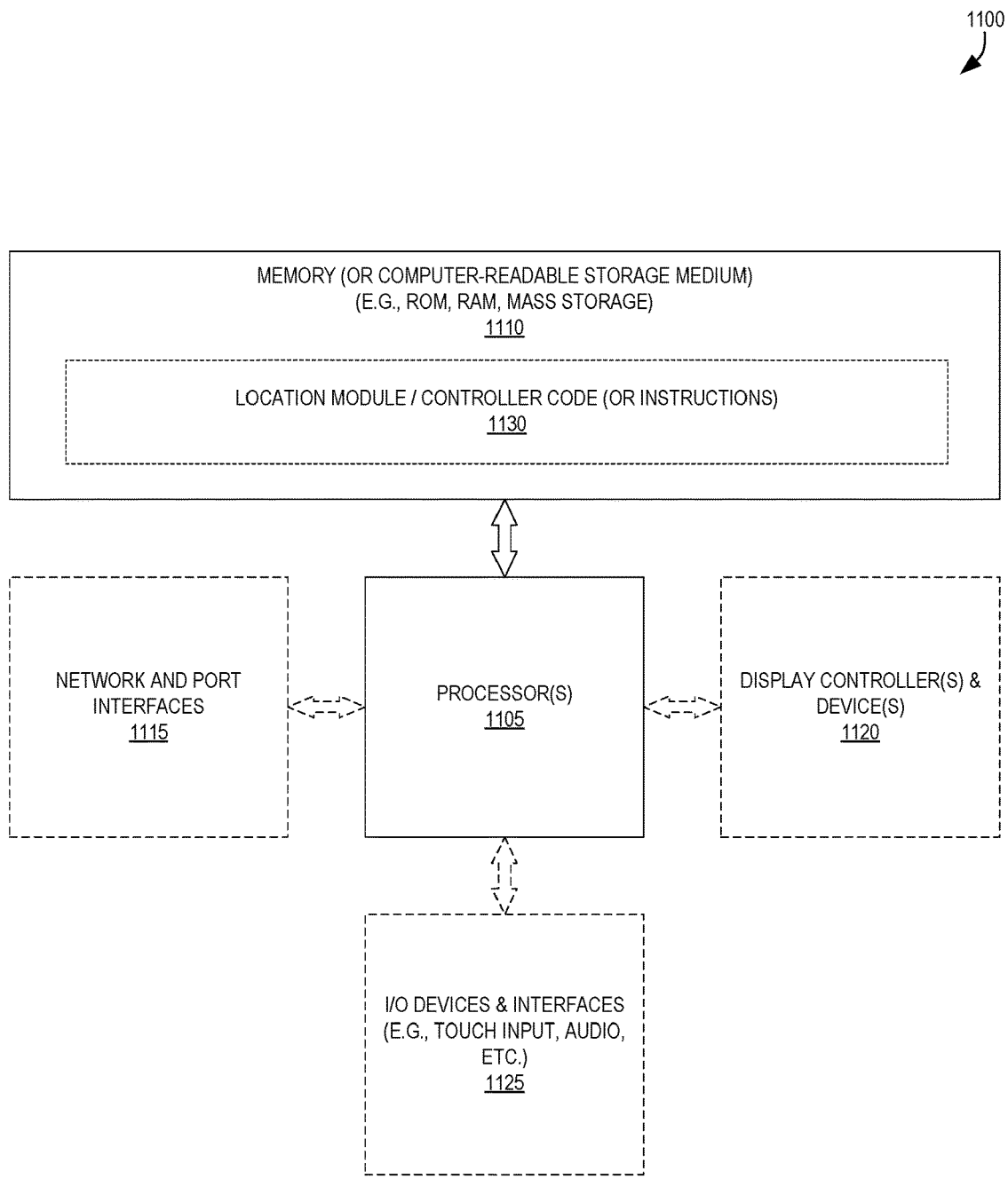
FIG. 11 illustrates a block diagram of an exemplary data processing system that may be used in some embodiments.

FIG. 11 illustrates a block diagram of an exemplary data processing system 1100 that may be used in some embodiments. Data processing system 1100 includes one or more microprocessors 1105 and connected system components (e.g., multiple connected chips). Alternatively, the data processing system 1100 is a system on a chip. One or more such data processing systems 1100 may be utilized to implement the functionality of the mobile devices 102 and/or computing devices 110 and/or media playback devices 152, as illustrated in FIG. 1.

The data processing system 1100 includes memory 1110, which is coupled to the microprocessor(s) 1105. The memory 1110 may be used for storing data, metadata, and programs for execution by the microprocessor(s) 1105. For example, the depicted memory 1110 may store location module code or controller code 1130 that, when executed by the microprocessor(s) 1105, causes the data processing system 1100 to perform operations described herein (e.g., implement the location module 114 or controller 102). The memory 1110 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1110 may be internal or distributed memory.

The data processing system 1100 may also include a display controller and display device 1120 that provides a visual user interface for the user, e.g., Graphical User Interface (GUI) elements or windows. The display device 1120 can also display various media content to a user. The data processing system 1100 also can include one or more input or output ("I/O") devices and interfaces 1125, which are provided to allow a user to provide input to, receive output from, and otherwise transfer data to and from the system. These I/O devices 1125 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1100. The I/O devices and interfaces 1125 may also include a connector for a dock or a connector for a USB interface, FireWire, Thunderbolt, etc., to connect the system 1100 with another device, external component, or a network.

The data processing system 1100 can also include network and port interfaces 1115 such as wired Ethernet jacks, or wireless transceivers, such as an IEEE 802.11 transceiver, an infrared transceiver, a Bluetooth transceiver, a wireless cellular telephony transceiver (e.g., 2G, 3G, 4G, 5G), or another wireless protocol to connect the data processing system 1100 with another device, external component, or a network and receive stored instructions, data, tokens, etc.

In some embodiments, these various components will be provided as a system on a chip (SoC). It will be appreciated that one or more buses may be used to interconnect the various components shown in FIG. 11.

For example, the data processing system 1100 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1100 may be a network computer, server, or an embedded processing device within another device or consumer electronic product. As used herein, the terms computer, system, device, processing device, and "apparatus comprising a processing device" may be used interchangeably with the term data processing system 1100 and include the above-listed exemplary embodiments.

It will be appreciated that additional components, not shown, may also be part of the system 1100, and, in certain embodiments, fewer components than that shown in FIG. 11 may also be used in a data processing system 1100.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1110 or other non-transitory machine-readable storage medium. The software may further be transmitted or received over a network (not shown) via a network and/or port interface 1115. In various embodiments, hardwired circuitry may be used in combination with the software instructions to implement the present embodiments. Thus, the techniques are not limited to any specific combination of hardware circuitry and software, or to any particular source for the instructions executed by the data processing system 1100.

As used herein, an electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment may be implemented using different combinations of software, firmware, and/or hardware.

While the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first mobile device for automatically determining which location of a plurality of locations of a vehicle a user of the first mobile device is located at without knowing assistance of the user, the method comprising:

responsive to determining, by the first mobile device, that the first mobile device is likely in a vehicle and that the user is actively interacting with the first mobile device, capturing, by the first mobile device, a first image via an optical sensor of the first mobile device without assistance from the user for the capture;

determining, by the first mobile device, a first location of the user within the vehicle based upon an analysis of the first image, the analysis including an execution of a machine learning-based model that utilizes at least (1) image data labeled with one or more location identifiers and (2) the captured first image as an input to determine the first location of the user within the vehicle, wherein the image data is associated with one or more vehicles;

determining, by first mobile device, a second location of a second mobile device in the vehicle, wherein the second mobile device is to (1) determine the second location of the second mobile device using a second image captured by the second mobile device and a machine learning-based model and (2) report the second location of the second mobile device to the first mobile device; and after determining the first location of the first mobile device and the second location of the second mobile device, performing, by the first mobile device, one or more actions.

2. The method of claim 1, wherein the first location includes a set of likelihoods the user is located in one or more locations within the vehicle based on the first image.

3. The method of claim 2, wherein the first location includes a vector of pairs of (1) locations from the one or more locations and (2) probabilities of the user being within an associated location.

4. The method of claim 1, wherein the image data with corresponding location identifiers are verified to be accurate prior to use for supervised training of the machine learning-based model, wherein the verification is based on one or more of (1) a likelihood associated with a location identifier exceeding a threshold and (2) confirmation by a human in relation to a location identifier.

5. The method of claim 1, wherein the machine learning-based model further determines the first location of the user based on sensor data from one or more of recorded audio from a microphone of the first mobile device, touch data from a touch sensor of the first mobile device, temperature data from a thermometer of the first mobile device, and accelerometer data from an accelerometer of the first mobile device.

6. The method of claim 1, wherein the optical sensor is a rear-facing camera of the first mobile device and the first mobile device further comprises a second optical sensor that is a front-facing camera;

wherein the method further comprises capturing a third image via the second optical sensor; and the determining of the first location is further based at least in part upon the third image, which is used as an input to the machine learning-based model.

7. The method of claim 1, wherein the optical sensor is a front-facing camera of the first mobile device.

8. The method of claim 1, wherein:

the determined first location is that of a driver of the vehicle; and the one or more actions include at least one of: transmitting a message indicating an alert via a physical network interface of the first mobile device, and causing an audio message to be played via a speaker that asks whether the user desires to activate a feature.

9. The method of claim 1, wherein the one or more actions include causing, by the first mobile device, a message to be transmitted to a remote server that identifies the first location of the user and further identifies using the machine learning-based model a second user of the second mobile device or the second mobile device or a location of either the second user or the second mobile device.

10. The method of claim 1, further comprising:

determining, by the first mobile device using the optical sensor or a second optical sensor of the first mobile device and another machine learning-based model, whether there is another person that is not the user in the vehicle or an animal that is in the vehicle.

11. The method of claim 10, wherein the one or more actions include causing, by the first mobile device, a message to be transmitted to a remote server that identifies the first location and the second location.

12. The method of claim 11, wherein a receipt of the message by the remote server causes the remote server to determine one or more media content items to be recommended or played based on the first and second locations.

13. The method of claim 11, wherein a receipt of the message by the remote server causes the remote server to transmit another message that causes an output device to change an audio output volume or a video display setting.

14. A non-transitory computer-readable storage medium storing instructions which, when executed by one or more processors of a first mobile device, cause the first mobile device to perform operations for automatically determining which location of a plurality of locations of a vehicle a user of the first mobile device is located at without knowing assistance of the user, the operations comprising:

responsive to determining that the first mobile device is likely in a vehicle and that the user is actively interacting with the first mobile device, capturing, by the first mobile device, a first image via an optical sensor of the first mobile device without assistance from the user for the capture;

determining a first location of the user within the vehicle based upon an analysis of the first image, the analysis including an execution of a machine learning-based model that utilizes at least (1) image data labeled with one or more location identifiers and (2) the captured first image as an input to determine the first location of the user within the vehicle, wherein the image data is associated with one or more vehicles;

determining a second location of a second mobile device in the vehicle, wherein the second mobile device is to (1) determine the second location of the second mobile device using a second image captured by the second mobile device and a machine learning-based model and (2) report the second location of the second mobile device to the first mobile device; and after determining the first location of the first mobile device and the second location of the second mobile device, performing one or more actions.

15. The non-transitory computer-readable storage medium of claim 14, wherein the first location includes a set of likelihoods the user is located in one or more locations within the vehicle based on the image.

16. The non-transitory computer-readable storage medium of claim 15, wherein the first location includes a vector of pairs of (1) locations from the one or more locations and (2) probabilities of the user being within an associated location.

17. The non-transitory computer-readable storage medium of claim 14, wherein the image data with corresponding location identifiers are verified to be accurate prior to use for supervised training of the machine learning-based model, wherein the verification is based on one or more of (1) a likelihood associated with a location identifier exceeding a threshold and (2) confirmation by a human in relation to a location identifier.

18. The non-transitory computer-readable storage medium of claim 14, wherein the machine learning-based model further determines the first location of the user based on sensor data from one or more of recorded audio from a microphone of the first mobile device, touch data from a touch sensor of the first mobile device, temperature data from a thermometer of the first mobile device, and accelerometer data from an accelerometer of the first mobile device.

19. The non-transitory computer-readable storage medium of claim 14, wherein the optical sensor is a rear-facing camera of the first mobile device and the first mobile device further comprises a second optical sensor that is a front-facing camera;
wherein the operations further comprise capturing a third image via the second optical sensor; and
the determining of the first location is further based at least in part upon the third image, which is used as an input to the machine learning-based model.

20. The non-transitory computer-readable storage medium of claim 14, wherein the optical sensor is a front-facing camera of the first mobile device.

21. The non-transitory computer-readable storage medium of claim 14, wherein:
the determined first location is that of a driver of the vehicle; and
the one or more actions include at least one of: transmitting a message indicating an alert via a physical network interface of the first mobile device, and causing an audio message to be played via a speaker that asks whether the user desires to activate a feature.

22. The non-transitory computer-readable storage medium of claim 14, wherein the one or more actions include causing, by the first mobile device, a message to be transmitted to a remote server that identifies the first location of the user and further identifies using the machine learning-based model a second user of the second mobile device or the second mobile device or a location of either the second user or the second mobile device.

23. The non-transitory computer-readable storage medium of claim 14, the operations further comprise:
determining, using the optical sensor or a second optical sensor of the first mobile device and another machine learning-based model, whether there is another person that is not the user in the vehicle or an animal that is in the vehicle.

24. The non-transitory computer-readable storage medium of claim 23, wherein the one or more actions include causing, by the first mobile device, a message to be transmitted to a remote server that identifies the first location and the second location.

25. The non-transitory computer-readable storage medium of claim 24, wherein a receipt of the message by the remote server causes the remote server to determine one or more media content items to be recommended or played based on the first and second locations.

26. The non-transitory computer-readable storage medium of claim 24, wherein a receipt of the message by the remote server causes the remote server to transmit another message that causes an output device to change an audio output volume or a video di splay setting.

27. A mobile device comprising:
one or more processors; and
a non-transitory computer-readable storage medium storing instructions which, when executed by the one or more processors, cause the first mobile device to automatically determine which location of a plurality of locations of a vehicle a user of the first mobile device is located at without knowing assistance of the user, the first mobile device to:
responsive to a determination that the first mobile device is likely in a vehicle and that the user is actively interacting with the first mobile device, capture an image via an optical sensor of the first mobile device without assistance from the user for the capture;
determine a first location of the user within the vehicle based upon an analysis of the first image, the analysis including an execution of a machine learning-based model that utilizes at least (1) image data labeled with one or more location identifiers and (2) the captured first image as an input to determine the first location of the user within the vehicle, wherein the image data is associated with one or more vehicles;
determine a second location of a second mobile device in the vehicle, wherein the second mobile device is to (1) determine the second location of the second mobile device using a second image captured by the second mobile device and a machine learning-based model and (2) report the second location of the second mobile device to the first mobile device; and
after the determination of the first location of the first mobile device and the second location of the second mobile device, perform one or more actions.

28. The mobile device of claim 27, wherein the one or more actions include causing, by the first mobile device, a message to be transmitted to a remote server that identifies the first location and the second location.

* * * * *